United States Patent Office

Re. 27,093
Reissued Mar. 23, 1971

27,093

THICK, CURED POLYMETHYL METHACRYLATE ARTICLE AND PROCESS FOR ITS PREPARATION

Donald H. Slocum, Moorestown, N.J., assignor to E. I. du Pont de Nemours and Company, Wilmington, Del.

No Drawing. Original No. 3,405,088, dated Oct. 8, 1968, Ser. No. 434,691, Feb. 23, 1965. Application for reissue Feb. 2, 1970, Ser. No. 11,239
Int. Cl. C08f *29/46, 45/04, 45/06*
U.S. Cl. 260—41 16 Claims

Matter enclosed in heavy brackets [ ] appears in the original patent but forms no part of this reissue specification; matter printed in italics indicates the additions made by reissue.

ABSTRACT OF THE DISCLOSURE

The use of at least 40% of an inert filler, e.g., calcium carbonate, calcium sulfate, clay, silica, calcium silicate, etc. along with a hemi-perester of maleic acid catalyst in the polymerization and curing of methyl methacrylate-containing sirups provides a process for forming thick (¼" to 2" or more) articles of polymeric methyl methacrylate within reasonable periods and at moderate temperatures.

*BACKGROUND OF INVENTION*

This invention relates to the polymerization and curing of methyl methacrylate-containing sirups. More particularly, it relates to the production of relatively thick articles of polymeric methyl methacrylate, e.g., methyl methacrylate homopolymer and copolymers of methyl methacrylate with α-β-ethylenically unsaturated compounds (vinyl acetate, styrene, alkyl acrylates, other alkyl methacrylates, etc.).

The desirability and commercial utility of thick (from about ¼ to 2 or more inches) articles of polymeric methyl methacrylate is well acknowledged. Such articles would be extremely useful as counter tops, dresser tops, vanity tops, shelving, wainscoting, etc. However, the processes heretofore suggested for producing such sections of methyl methacrylate polymer either require too much time or they cannot be operated at moderate temperatures; and, in most cases, such processes yield a product containing unsightly voids and/or surface blemishes. In short, the processes of the prior art will not produce a methyl methacrylate polymeric product that can compete against wood, laminates or other synthetic materials in today's market place.

It is an object of this invention to provide a commercially acceptable section, sheet or article of polymeric methyl methacrylate having a thickness of at least ¼ inch and preferably a thickness of ¾–2 inches or more. It is a further object to provide a commercially feasible process for producing such articles. Other objects will appear hereinafter.

*SUMMARY OF THE INVENTION*

The objects are accomplished by mixing a sirup containing 10–35% by weight of methyl methacrylate polymer having an inherent viscosity of 0.25–1.0 dissolved in monomeric methyl methacrylate, at least 40%, preferably 40–85% by weight of inert additives (preferably particles or fibers selected from the group consisting of calcium carbonate, calcium sulfate and clay), with 0.2–6% (preferably 0.75–2%) based on the total weight of the mixture of a hemi-perester of maleic acid having the formula:

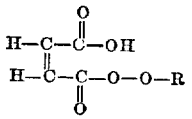

wherein R is a saturated tertiary alkyl radical, preferably where R is tertiary butyl as in monotertiary butyl peroxymaleate sometimes referred to as t-butyl permaleic acid;

pouring the mixture into a container to form a layer that is at least ¼ inch (preferably ¾–2 inches) thick; and permitting the layer to cure autogenically in air at a temperature of 15–40° C.

The process described will generally produce a commercially acceptable article that is substantially smooth and void-free in not more than about 2.5 hours, usually less than one hour. The specific time period will depend upon the geometry of the casting, the amount of inert additives used, the amount of the hemi-perester catalyst used, etc. The time will also depend upon the sequence of adding the various ingredients. The preferred sequence involves mixing the sirup and the hemi-perester catalyst before adding the inert additives or filler. However, if a shorter process time is desired, then the catalyst may be added immediately after the filler. It should also be understood that the process provides considerable latitude in the incorporation of pigments into the mixture. These may be added at anytime before the mixture has hardened to provide a variety of color effects differing in hue and pattern.

The starting sirup or polymer-in-monomer solution may be prepared by any of the methods described in British Patent No. 870,191, or U.S. Patent No. 3,154,600. Specifically, the sirup may be made by heating a small amount of a polymerization initiator in solution in the methacrylic ester and in the presence of a chain transfer agent at a suitable pressure and temperature. Heating is continued until the solution reaches a predetermined viscosity. Thereafter, the hot solution is quenched by the addition of cold monomer containing a polymerization inhibitor. More specifically, a sirup having a viscosity of 0.5–50 poises at 25° C. can be produced from methyl methacrylate by heating the monomeric methyl methacrylate in a jacketed kettle at a temperature of 50–150° C. under refluxing conditions. Atmospheric pressure is used and the refluxing material is stirred. Heating is conducted in the presence of a very small amount of initiator and from 0.05–1.0 mole percent of a chain transfer agent such as the alkyl mercaptans and the mercaptans described in U.S. Pat. No. 3,154,600. When a bulk viscosity in the range of 0.5 to 50 poises, which corresponds to an inherent viscosity of 0.25–1.0, is attained and the initiator content has been reduced substantially to zero, i.e., below 20 parts per million, the polymerization is stopped by cooling in any suitable manner. One method of cooling involves adding 1–10% by weight of cold methyl methacrylate containing sufficient hydroquinone or other polymerization inhibitor to inhibit further polymerization of the methyl methacrylate. For the purpose of the present invention, the final solution contains 10–35% by weight of the methyl methacrylate polymer dissolved in the methyl methacrylate monomer. The polymer has an inherent viscosity of 0.25–1.0 determined at 20° C. using a solution of 0.50 gram of the polymer per 100 milliliters of chloroform in accordance with the method described in F. W. Billmeyer, Textbook of Polymer Chemistry, Interscience Publishing Inc. (1957), p. 128. As mentioned previously, the polymer may also be a copolymer involving a major portion of the methyl methacrylate monomer with such monomers as vinyl acetate, styrene, methyl acrylate, ethyl acrylate, butyl acrylate, cyclohexyl acrylate, ethyl methacrylate, butyl methacrylate, cyclohexyl methacrylate, etc.

The sirup may also contain a cross-linking agent, added to the sirup in an amount up to 20% by weight upon completion of quenching. Any suitable poly-unsaturated cross-linking agent may be used, e.g., ethylene dimethacrylate, propylene dimethacrylate, polyethylene glycol dimethacrylate, divinyl benzene, triallyl cyanurate, and diallyl phthalate. If desired, a portion, i.e., up to about 2% of the cross-linking agent may be added to the sirup prior to quenching.

The preferred hemi-perester, as stated previously, is monotertiary butyl peroxymaleate. However, other useful hemi-peresters include those where the saturated tertiary alkyl of the hemi-perester is t-amyl, 1-methylcyclohexyl and the p-methyl. The hemi-peresters may be prepared by processes well known in the art. For example, monotertiary butyl peroxymaleate may be prepared by the following reaction:

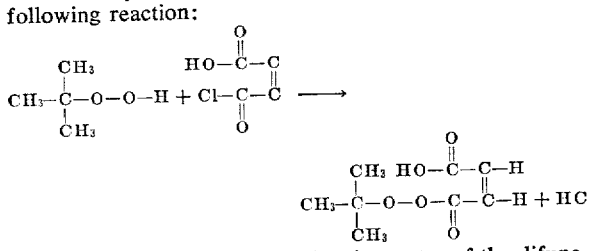

As mentioned previously, the hemi-perester of the difunctional acid should be present in an amount greater than 0.2% by weight in order to obtain the advantages of the present invention. The upper limit of 6% is merely to indicate that no additional advantage seems to be obtained by adding more than that percentage of the hemi-perester. If desired, other initiators may be used with the critical hemi-perester. In addition, curing acids may be used. These include the chlorides of antimony and soluble copper salts as disclosed in U.S. Patent No. 3,084,068, the chlorides of tin, etc.

The critical finding in the present invention is that by using at least 40% of a filler, relatively thick articles can be produced in a commercially acceptable fashion, both from the standpoint of the process and the appearance of the final article. The fillers used may be any of those that do not interfere with the polymerization of the acrylic resin, e.g., calcium carbonate, calcium sulfate, clay, silica, glass, calcium silicate, alumina, carbon black, titania, powdered metals, etc. However, the preferred fillers are particles or fibers of calcium carbonate, calcium sulfate and clay. The clacium carbonate may be obtained by precipitation or by grinding marble or limestone. It has been found that at least 40% of the filler is necessary for a satisfactory process and product where the product is ¼ inch thick. However, where the final product is two inches thick, it has been found that as much as 80% filler may be used for obtaining optimum results. Because of the relative inexpensiveness of the filler compared to the resin, the process of the present invention provides an additional commercial advantage.

The invention will be more clearly understood by referring to the examples which follow. The examples, which illustrate specific embodiments of the present invention, should not be construed to limit the invention in any way.

Example 1

A sirup of 10% methyl methacrylate homopolymer in methyl methacrylate monomer is prepared by partial polymerization in situ, as described in Example 2 of U.S. Pat. No. 3,154,600. To 225 grams of the sirup is added 275 grams of "Non Fer Al," a precipitated particulate calcium carbonate having an average particle size of 7 microns. To the mixture, which contains 55% of the inert additive, is then added 1% (2.25 grams) of t-butyl peroxymaleic acid.

The resulting mixture is poured into an aluminum pan to form a layer ¾ inch deep. The layer is then permitted to cure autogenically. After 2.5 hours it is removed from the pan as a hard, void-free sheet, ¾ inch thick.

Control A is prepared without any calcium carbonate filler. The sirup of 10% methyl methacrylate homopolymer in methyl methacrylate monomer containing 1% t-butyl peroxymaleic acid is poured into the aluminum pan to a depth of ¾ inch. No cure is realized after 16 hours.

In Controls B, C and D, the example is repeated using 1% benzoyl peroxide (2.25 grams), 0.75% t-butyl peroxypivalate (1.68 grams) and 2% methyl ethyl ketone peroxide (4.5 grams), respectively. The ¾ inch thick layers of Controls B, C and D do not harden nor show any signs of curing after 5 hours.

Examples 2 and 3

The 55% filled sirup of Example 1 containing 1% of t-butyl peroxymaleic acid is poured into two open containers. In the container of Example 2, a 1-inch layer is obtained; in that of Example 3, a 2-inch layer. The casting of Example 2 is cured hard without boiling to counter top quality in about 2.5 hours. The casting of Example 3 is similarly cured hard in less than 1.5 hours.

In a control, a ⅛-inch layer from the identical mixture is only partially cured after 2.5 hours.

Example 4

A sirup containing 25% methyl methacrylate homopolymer (inherent viscosity between 0.25–1.0) in methyl methacrylate monomer is filled with 80% calcium carbonate. t-Butyl peroxymaleic acid to the extent of 1% is added and the mixture is cured in a 2-inch thick section open to the air in a period of less than 2 hours.

In a control only 30% calcium carbonate is used. In all other respects the procedure is the same as Example 4. The time to effect a cure is over 3 hours.

Examples 5 and 6

The process will operate in the presence of other peroxide initiators provided that the t-butyl peroxymaleic acid is also present.

Thus, a sirup composed of 800 grams of a 25% solution of methyl methacrylate homopolymer in methyl methacrylate monomer may be used with 1200 grams of calcium carbonate filler, 8 grams of lauryl mercaptan and 6.4 grams of a 5% stannous chloride solution in alcohol. In Example 5, 2 grams of t-butyl peroxymaleic acid is added; the blend is degassed under a vacuum of 20 inches of mercury; and the degassed blend is cast onto an aluminum tray to form a 1-inch thick section. In Example 6, 1 gram of t-butyl peroxymaleic acid is added along with 2 grams of lauroyl peroxide prior to degassing and casting the 1-inch thick section. The section of Example 5 cured in 30 minutes and the section of Example 6 cured in 60 minutes.

What is claimed is:

1. A process for preparing articles which comprises mixing (a) a sirup containing 10–35% by weight of methyl methacrylate polymer selected from the group consisting of methyl methacrylate homopolymer and copolymers of methyl methacrylate with $\alpha,\beta$-ethylenically unsaturated compounds, said copolymers containing more than 50% methyl methacrylate, said polymer having an inherent viscosity of 0.25–1.0, in monomeric methyl methacrylate, (b) 40–85% by weight of inert additive selected from the group consisting of calcium carbonate, calcium sulfate, [clay] *alumina,* silica and calcium silicate, and (c) 0.2–6% by weight of a hemi-perester of maleic acid having the formula

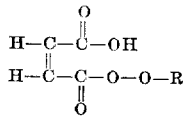

wherein R is a saturated tertiary alkyl radical; pouring the mixture into a container to form a layer, said layer being at least ¼ inch thick; and permitting said layer to cure autogenically in air at a temperature of 15–40° C. to form an article that is at least ¼ inch thick.

2. A process as in claim 1 wherein said methyl methacrylate polymer is methyl methacrylate homopolymer.

3. A process [as in claim 1] *for preparing articles which comprises mixing*

*(a) a sirup containing 10–35% by weight of methyl methacrylate polymer selected from the group consisting of methyl methacrylate homopolymer and copolymers of methyl methacrylate with α,β-ethylenically unsaturated compounds, said copolymers containing more than 50% methyl methacrylate, said polymer having an inherent viscosity of 0.25–1.0, in monomeric methyl methacrylate,*

*(b) 40–85% by weight of inert additive comprising* [wherein said inert additive is selected from the group consisting of calcium carbonate, calcium sulfate and] clay, *and*

*(c) 0.2–6% by weight of a hemi-perester of maleic acid having the formula*

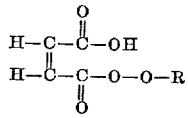

*wherein R is a saturated tertiary alkyl radical; pouring the mixture into a container to form a layer, said layer being at least ¼ inch thick; and permitting said layer to cure autogenically in air at a temperature of 15–40% C. to form an article that is at least ¼ inch thick.*

4. A process as in claim 1 wherein said inert additive is calcium carbonate.

5. A process as in claim 1 wherein said hemi-perester of maleic acid is monoteritary butyl peroxymaleate.

6. A process as in claim 1 wherein said layer and said article are ¾–2 inches thick.

7. A mixture for preparing articles at least ¼ inch thick which comprises (a) a sirup containing 10–35% by weight of methyl methacrylate polymer selected from the group consisting of methyl methacrylate homopolymer and copolymers of methyl methacrylate with α,β-ethylenically unsaturated compounds, said copolymers containing more than 50% methyl methacrylate, said polymer having an inherent viscosity of 0.25–1.0, in monomeric methyl methacrylate, (b) 40–85% by weight of inert additive selected from the group consisting of calcium carbonate, calcium sulfate, [clay] *alumina*, silica and calcium silicate, and (c) 0.2–6% by weight of a hemi-perester of maleic acid having the formula

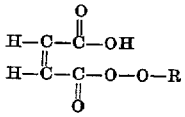

wherein R is a saturated tertiary alkyl radical.

8. A mixture as in claim 7 wherein said methyl methacrylate polymer is methyl methacrylate homopolymer.

9. A mixture [as in claim 7] *for preparing articles at least ¼ inch thick which comprises*

*(a) a sirup containing 10–35% by weight of methyl methacrylate polymer selected from the group consisting of methyl methacrylate homopolymer and copolymers of methyl methacrylate with α,β-ethylenically unsaturated compounds, said copolymers containing more than 50% methyl methacrylate, said polymer having an inherent viscosity of 0.25–1.0, in monomeric methyl methacrylate,*

*(b) 40–85% by weight of inert additive comprising* [wherein said inert additive is selected from the group consisting of calcium carbonate, calcium sulfate and] clay, *and*

*(c) 0.2–6% by weight of a hemi-perester of maleic acid having the formula*

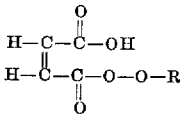

*wherein R is a saturated tertiary alkyl radical.*

10. A mixture as in claim 7 wherein said inert additive is calcium carbonate.

11. A mixture as in claim 7 wherein said hemi-perester of maleic acid is monotertiary butyl peroxymaleate.

12. An article comprising a methyl methacrylate polymer selected from the group consisting of methyl methacrylate homopolymer and copolymers of methyl methacrylate with α,β-ethylenically unsaturated compounds, said copolymers containing more than 50% methyl methacrylate and 40–85% by weight of inert additive selected from the group consisting of calcium carbonate, calcium sulfate, [clay] *alumina*, silica and calcium silicate, said article being at least ¼ inch thick, said inert additive being distributed substantially uniformly throughout said polymer.

13. An article as in claim 12 that is ¾–2 inches thick.

14. An article [as in claim 12] *comprising a methyl methacrylate polymer selected from the group consisting of methyl methacrylate homopolymer and copolymers of methyl methacrylate with α,β-ethylenically unsaturated compounds, said copolymers containing more than 50% methyl methacrylate and 40–85% by weight of inert additive comprising* [wherein said inert additive is selected from the group consisting of calcium carbonate, calcium sulfate and] clay, *said article being at least ¼ inch thick, said inert additive being distributed substantially uniformly throughout said polymer.*

15. An article as in claim 12 wherein said inert additive is calcium carbonate.

16. A process as in claim 1 wherein said sirup and said hemi-perester of maleic acid are mixed prior to the addition of said inert additive.

References Cited

The following references, cited by the Examiner, are of record in the patented file of this patent or the original patent.

UNITED STATES PATENTS

| | | | |
|---|---|---|---|
| 3,073,795 | 1/1963 | Vererka | 260—41 |
| 3,085,080 | 4/1963 | Ferrigno | 260—41 |
| 3,154,600 | 10/1964 | Munn | 260—41 |
| 3,234,194 | 2/1966 | Slocum | 260—89.5A |

ALLAN LIEBERMAN, Primary Examiner

U.S. Cl. X.R.

260—89.5

PO-1050
(5/69)

UNITED STATES PATENT OFFICE
CERTIFICATE OF CORRECTION

Patent No. RE 27,093 Dated March 23, 1971

Inventor(s) Donald H. Slocum

It is certified that error appears in the above-identified patent and that said Letters Patent are hereby corrected as shown below:

Column 5, line 25 of Claim 3, "15-40% C." should read -- 15-40°C. --

Signed and sealed this 2nd day of November 1971.

(SEAL)
Attest:

EDWARD M.FLETCHER,JR.
Attesting Officer

ROBERT GOTTSCHALK
Acting Commissioner of Patents